June 16, 1925.  1,541,869
R. SPRENGER
PROCESS FOR THE PRODUCTION OF CERAMIC WARE
Filed April 4, 1921
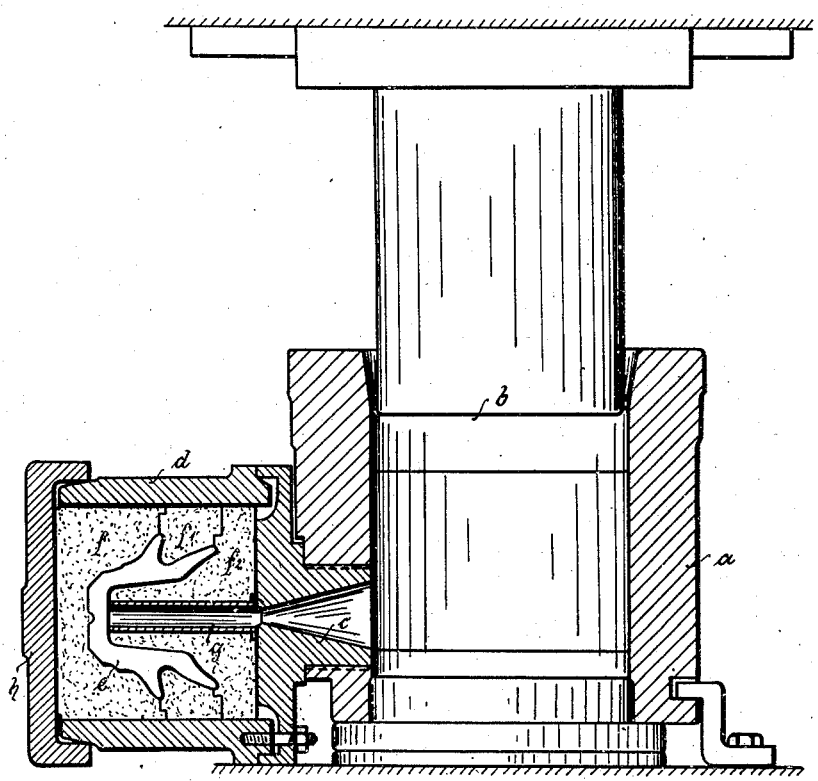
Inventor:
Richard Sprenger
by
W. E. Evans
Attorney Patented June 16, 1925.

1,541,869

UNITED STATES PATENT OFFICE.

RICHARD SPRENGER, OF BERLIN-HENNINGSDORF, GERMANY.

PROCESS FOR THE PRODUCTION OF CERAMIC WARE.

Application filed April 4, 1921. Serial No. 458,619.

(GRANTED UNDER THE PROVISIONS OF THE ACT OF MARCH 3, 1921, 41 STAT. L., 1313.)

*To all whom it may concern:*

Be it known that I, RICHARD SPRENGER, a subject of the State of Germany, residing at 41, Neuendorfstrasse, Berlin-Henningsdorf, Germany, have invented certain new and useful Processes for the Production of Ceramic Ware, of which the following is a specification.

According to the invention the manufacture of porcelain ware is very much simplified by allowing the plastic porcelain mass, which has been mixed, in known way, to be extruded from a container by pressure into a mould through an inlet extending through part of the mould and into the moulding space which is completely closed except for the inlet and a pipe serving as an air vent.

Such a method of working ensures that there is available a large quantity of plastic material for extrusion into the mould and the removal of the pressing element is unnecessary, so that after the previously prepared moulds have been exchanged, the pressing operation can proceed at short intervals. In this way articles can be produced in large quantities from plastic porcelain in the same way as in the metal extrusion process.

The container for receiving the plastic porcelain can be advantageously constructed of cylindrical form, with a plunger actuated either hydraulically or by compressed air, adapted to act within it.

The plasticity of the mass and therefore the degree of moisture must, of course, be regulated according to the shape of the article to be pressed; that is to say, in order to obtain a complete filling of the mould, it is necessary to have the plasticity and the quantity of moisture in the plastic mass greater according as the shape of the object to be pressed is more complicated. The most complicated objects can, however, be manufactured by the present process, in a condition ready for drying and burning.

In the drawing an apparatus for carrying out the process is represented in vertical section. The cylinder $a$ is intended for the reception of the plastic mass, and within it is disposed the plunger $b$ which is, preferably, actuated by hydraulic pressure. Towards the bottom of the cylinder $a$ an exchangeable or adjustable discharge nozzle $c$ is fitted, to which is attached the removable mould box $d$. The mould for the object to be produced is provided within the mould-box $d$. The mould represented in the drawing is adapted for the production of a supporting insulator, and consists of three sections $f$, $f^1$, $f^2$, the sections $f$ and $f^2$ being formed as single integral parts, while the section $f^1$ is made up of three separable segmental parts. This construction is necessary in order to permit of the withdrawal of the moulded object. An inlet pipe $g$ is attached to the nozzle $c$ and extends through the part of the mould $f^2$ to extend into the moulding space, that is to say, the inlet-pipe $g$ reaches into the moulding space to the most advantageous position for distribution of the mass. According to the shape of the object to be produced, one, two or more inlet-pipes may be employed. The mould box is closed by the cover plate $h$. A suitable device for allowing the escape of the air from the mould, and also an indicator which shows when the mass is forced in has completely filled the mould, and advantageously included in the construction, but are not represented in the drawing. To avoid air-bubbles in the produced object, it is advisable before the pressing operation that the air present in the mould should be drawn off by suction, by a suitable suction apparatus. The separate parts of the mould are, preferably, formed of gypsum or of similar absorbent material, which takes the moisture from the object being moulded, so that the object shrinks and can thus be more easily withdrawn from the mould.

I claim:

1. A process for the manufacture of ware from ceramic material and especially porcelain, consisting in applying pressure upon a mass of ceramic material within a container while the said material is in a plastic and non-fluid condition, extruding thereby a portion of the said mass from the container through an inlet into a mould, which inlet extends through a part of the mould into a position when the extended material is distributed to fill the moulding space, substantially as described.

2. A process for the manufacture of supporting insulators from ceramic material of the character of porcelain, consisting in applying pressure upon a mass of ceramic material within a container while the said material is in a plastic and non-fluid condition, extruding thereby a portion of the said mass from the container through an inlet into a mould which inlet extends centrally through a part of the mould to discharge the mass into the moulding space in a central position whence it is distributed to fill the moulding space, substantially as described.

3. A process for the manufacture of supporting insulators from ceramic material of the character of porcelain, consisting in applying pressure upon a mass of ceramic material within a container while the said material is in a plastic and non-fluid condition, extruding thereby a portion of the said mass from the container through an inlet into a mould, the said mould being formed of a number of separable parts, and the said inlet extending centrally through a part of the mould to discharge the mass into the moulding space in a central position whence it is distributed to fill the moulding space, substantially as described.

RICHARD SPRENGER.